United States Patent
Buck

(10) Patent No.: US 10,062,189 B2
(45) Date of Patent: *Aug. 28, 2018

(54) GRAPHICAL DISPLAY WITH INTEGRATED RECENT PERIOD ZOOM AND HISTORICAL PERIOD CONTEXT DATA

(71) Applicant: Trading Technologies International, Inc., Chicago, IL (US)

(72) Inventor: Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,263

(22) Filed: Nov. 16, 2017

(65) Prior Publication Data

US 2018/0089868 A1    Mar. 29, 2018

Related U.S. Application Data

(63) Continuation of application No. 15/363,899, filed on Nov. 29, 2016, now Pat. No. 9,852,530, which is a
(Continued)

(51) Int. Cl.
*G06T 11/20* (2006.01)
*G06T 3/40* (2006.01)
(Continued)

(52) U.S. Cl.
CPC ........ *G06T 11/206* (2013.01); *G06F 3/04817* (2013.01); *G06F 3/04845* (2013.01);
(Continued)

(58) Field of Classification Search
CPC .................................................... G06T 11/206
See application file for complete search history.

(56) References Cited

U.S. PATENT DOCUMENTS

| | | |
|---|---|---|
| 4,190,641 A | 2/1980 | Preston, Jr. |
| 5,228,119 A | 7/1993 | Mihalisin et al. |

(Continued)

FOREIGN PATENT DOCUMENTS

| | | |
|---|---|---|
| JP | 6301682 A | 10/1994 |
| JP | 2002240949 A | 8/2002 |
| JP | 2003140719 A | 5/2003 |

OTHER PUBLICATIONS

About 2-Dimensional Plot (No. 6) Webpage [online], tl6web.lanl.gov, Aug. 26, 2003, [Retrieved on Mar. 6, 2006] from the Internet: http://t16web.lanl.gov/Kawano/gnuplot/plot6-e.html.
(Continued)

*Primary Examiner* — Jeffrey Chow
(74) *Attorney, Agent, or Firm* — McDonnell Boehnen Hulbert & Berghoff LLP

(57) ABSTRACT

A system and method are provided for displaying a data series. In one embodiment, a graphical interface is provided including at least one axis that is divided into a plurality of axis regions. Preferably, each axis region uses a different linear scale, and the plurality of axis regions forms a continuous non-linear scale. The graphical interface also displays the data series in relation to the plurality of axis regions, and the data series is plotted in relation to each axis region based on a scale resolution corresponding to each respective axis region.

13 Claims, 7 Drawing Sheets

Related U.S. Application Data continuation of application No. 14/884,175, filed on Oct. 15, 2015, now Pat. No. 9,542,709, which is a continuation of application No. 13/960,778, filed on Aug. 6, 2013, now Pat. No. 9,189,874, which is a continuation of application No. 13/761,145, filed on Feb. 6, 2013, now Pat. No. 8,537,161, which is a continuation of application No. 13/587,865, filed on Aug. 16, 2012, now Pat. No. 8,395,625, which is a continuation of application No. 13/237,440, filed on Sep. 20, 2011, now Pat. No. 8,269,774, which is a continuation of application No. 13/106,770, filed on May 12, 2011, now Pat. No. 8,044,959, which is a continuation of application No. 12/604,979, filed on Oct. 23, 2009, now Pat. No. 7,965,292, which is a continuation of application No. 12/027,073, filed on Feb. 6, 2008, now Pat. No. 7,629,975, which is a continuation of application No. 11/415,977, filed on May 2, 2006, now Pat. No. 7,348,981, which is a continuation of application No. 10/814,986, filed on Mar. 31, 2004, now Pat. No. 7,218,325.

(51) Int. Cl.
    G06Q 40/04      (2012.01)
    G06F 3/0481     (2013.01)
    G06F 3/0484     (2013.01)
    G06Q 30/06      (2012.01)

(52) U.S. Cl.
    CPC ......... *G06F 3/04847* (2013.01); *G06Q 30/06* (2013.01); *G06Q 40/04* (2013.01); *G06T 3/40* (2013.01)

(56) References Cited

U.S. PATENT DOCUMENTS

| | | | |
|---|---|---|---|
| 5,347,452 A | 9/1994 | Bay, Jr. | |
| 5,463,731 A | 10/1995 | Diec et al. | |
| 5,684,507 A | 11/1997 | Rasnake et al. | |
| 5,684,508 A | 11/1997 | Brilman | |
| 5,912,656 A | 6/1999 | Tham et al. | |
| 6,064,401 A | 5/2000 | Holzman et al. | |
| 6,085,202 A | 7/2000 | Rao et al. | |
| 6,175,832 B1 | 1/2001 | Luzzi et al. | |
| 6,219,052 B1 | 4/2001 | Gould | |
| 6,271,863 B1 | 8/2001 | Bose et al. | |
| 6,380,953 B1 | 4/2002 | Mizuno | |
| 6,470,295 B1 | 10/2002 | Mirow et al. | |
| 6,628,312 B1 | 9/2003 | Rao et al. | |
| 6,944,818 B2 | 9/2005 | Newman et al. | |
| 7,212,208 B2 | 5/2007 | Khozai | |
| 7,218,325 B1 | 5/2007 | Buck | |
| 7,292,245 B2 | 11/2007 | Goggin | |
| 7,348,981 B1 | 3/2008 | Buck | |
| 7,356,501 B2 | 4/2008 | Churquina | |
| 7,384,987 B2 | 6/2008 | Iordache-Cazana et al. | |
| 7,590,587 B2 | 9/2009 | Duquette | |
| 7,629,975 B2 | 12/2009 | Buck | |
| 7,965,292 B2 | 6/2011 | Buck | |
| 8,044,959 B2 | 10/2011 | Buck | |
| 8,269,774 B2 | 9/2012 | Buck | |
| 8,395,625 B2 | 3/2013 | Buck | |
| 8,537,161 B2 | 9/2013 | Buck | |
| 9,189,874 B2 | 11/2015 | Buck | |
| 9,542,709 B2 | 1/2017 | Buck | |
| 2002/0161853 A1 | 10/2002 | Burak et al. | |
| 2003/0139989 A1 | 7/2003 | Churquina | |
| 2004/0164983 A1 | 8/2004 | Khozai | |
| 2005/0162423 A1 | 7/2005 | Goggin | |
| 2005/0228735 A1 | 10/2005 | Duquette | |
| 2005/0234799 A1 | 10/2005 | Hansen et al. | |
| 2010/0039432 A1 | 2/2010 | Buck | |
| 2011/0210974 A1 | 9/2011 | Buck | |
| 2012/0007868 A1 | 1/2012 | Buck | |
| 2012/0306888 A1 | 12/2012 | Buck | |
| 2013/0147807 A1 | 6/2013 | Buck | |
| 2014/0184609 A1 | 7/2014 | Buck | |
| 2016/0035030 A1 | 2/2016 | Buck | |
| 2017/0084063 A1 | 3/2017 | Buck | |

OTHER PUBLICATIONS

BrainTrading Solutions—Intelligent Trading Solutions Website [online], BrainTrading Solutions, Jul. 21, 2001, [Retrieved on Mar. 17, 2006] from the Internet: http://www.braintrading.com.

Erroneous Temperature vs Time Graph [online], www.astro.ucla. edu, Nov. 28, 1997, [Retrieved on Jul. 6, 2007] from the Internet: http://www.astro.ucla.edu/~wright/tvtmrrs2.html.

Pstock Webpages [online], www.pstock.com, Aug. 1, 2001.

Tufte, E.R., *The Visual Display of Quantitative Information*, Chesire, Connecticut: Graphics Press, 1983, pp. 60-71.

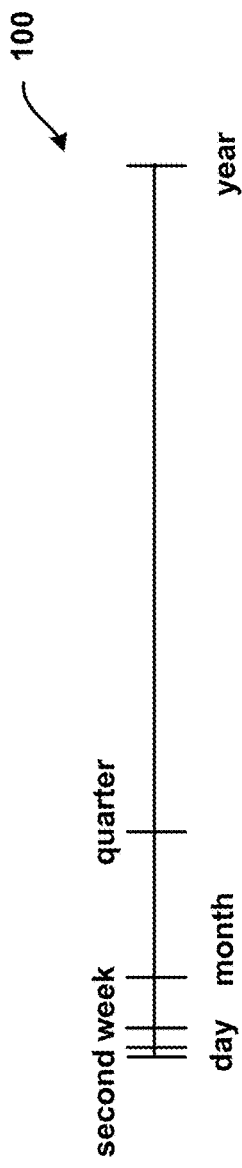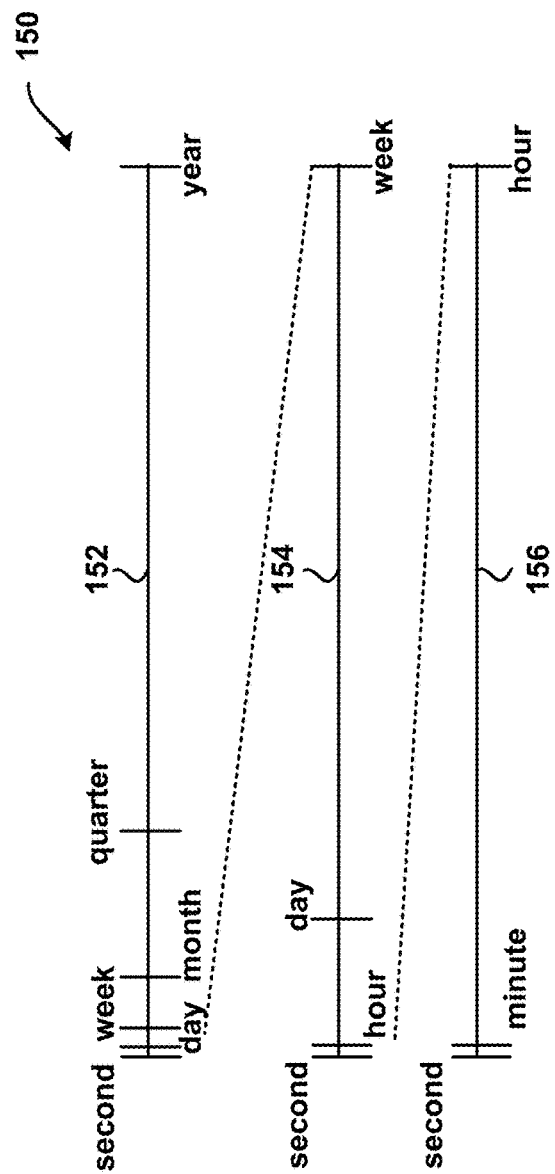

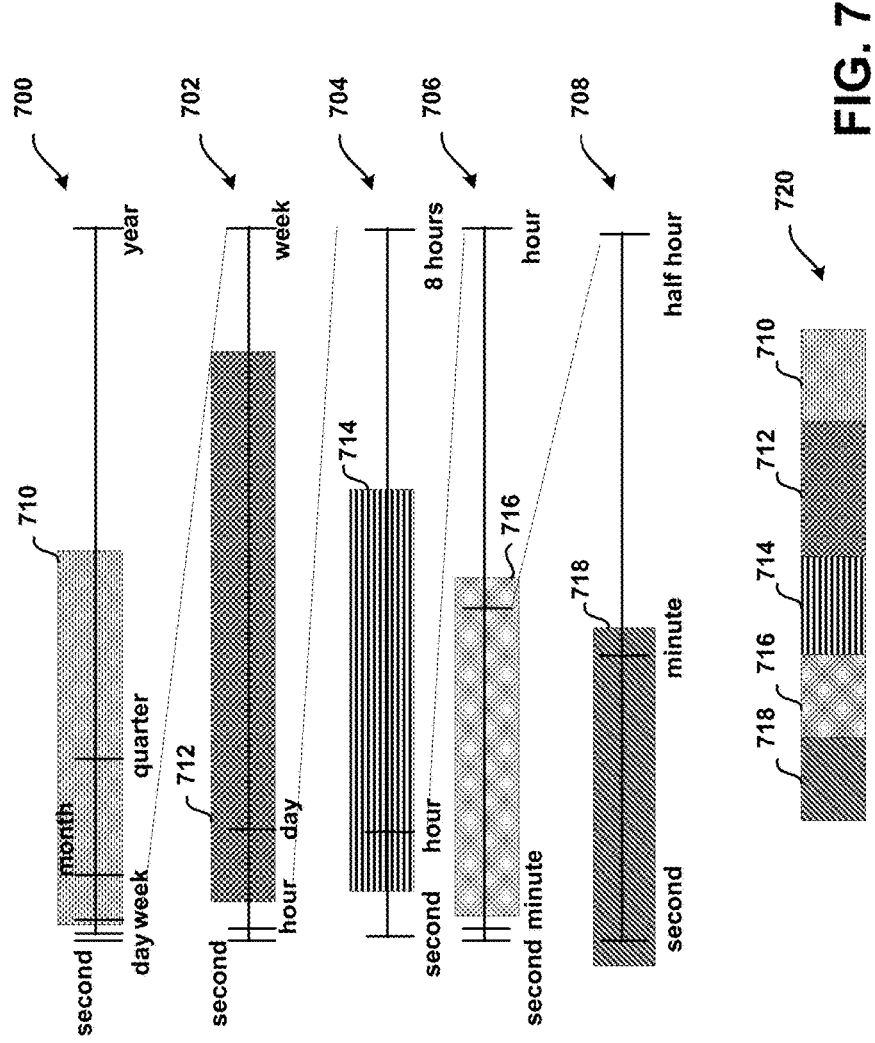

GRAPHICAL DISPLAY WITH INTEGRATED RECENT PERIOD ZOOM AND HISTORICAL PERIOD CONTEXT DATA

CROSS-REFERENCE TO RELATED APPLICATIONS

This application is a continuation of U.S. patent application Ser. No. 15/363,899, filed Nov. 29, 2016, now U.S. Pat. No. 9,852,530, which is a continuation of U.S. patent application Ser. No. 14/884,175, filed Oct. 15, 2015, now U.S. Pat. No. 9,542,709, which is a continuation of U.S. patent application Ser. No. 13/960,778, filed Aug. 6, 2013, now U.S. Pat. No. 9,189,874, which is a continuation of U.S. patent application Ser. No. 13/761,145, filed Feb. 6, 2013, now U.S. Pat. No. 8,537,161, which is a continuation of U.S. patent application Ser. No. 13/587,865, filed Aug. 16, 2012, now U.S. Pat. No. 8,395,625, which is a continuation of U.S. patent application Ser. No. 13/237,440, filed Sep. 20, 2011, now U.S. Pat. No. 8,269,774, which is a continuation of U.S. patent application Ser. No. 13/106,770, filed May 12, 2011, now U.S. Pat. No. 8,044,959, which is a continuation of U.S. patent application Ser. No. 12/604,979, filed Oct. 23, 2009, now U.S. Pat. No. 7,965,292, which is a continuation of U.S. patent application Ser. No. 12/027,073, filed Feb. 6, 2008, now U.S. Pat. No. 7,629,975, which is a continuation of U.S. patent application Ser. No. 11/415,977, filed May 2, 2006, now U.S. Pat. No. 7,348,981, which is a continuation of U.S. patent application Ser. No. 10/814,986, filed Mar. 31, 2004, now U.S. Pat. No. 7,218,325, entitled "Graphical Display with Integrated Recent Period Zoom and Historical Period Context Data," the contents of each of which are fully incorporated herein by reference for all purposes.

FIELD OF INVENTION

The present invention is directed to a graphical display interface for displaying data series. More specifically, the present invention is directed to displaying time series data in an electronic trading environment.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

Every day, there are thousands of traders buying and selling for many different reasons, such as, for example, fear of loss, hope of gain, hedging, broker recommendations, and many others. To profit in electronic markets, market participants must be able to assimilate large amounts of data in order to recognize market trends and to view current market conditions. However, trying to figure out why market participants are buying or selling can be very difficult. Chart patterns may put buying and selling activities into perspective by providing a concise picture of the two activities as a tool to analyze markets. Among many different market data types, traders may wish to view one or more price charts to forecast future price movements, for example. A price chart displays a sequence of prices plotted over a specific timeframe, as well as other information that can be useful in analyzing market trends and market patterns, including technical indicators, such as, for example, moving averages.

Typically, a timeframe used for forming a price chart depends on the level of data compression, and determines the level of detail of the displayed data. The timeframe of a price chart may be any timeframe, including, for example, intra-day, daily, weekly, monthly, quarterly, or annual. An intra-day chart may display open, close, high, and low prices for an identified interval, such as one or more minutes, or seconds during a trading day. Then, the daily chart may display a single set of price data for each day of trading depicted in the chart. The weekly chart is made up of daily data that has been compressed to show each week as a single point, and so forth.

Traders usually concentrate on charts made up of daily and intra-day data series to forecast short-term price movements, whereas weekly and monthly charts are typically used to spot long-term trends. While some traders may wish to view either a long-term chart or a short-term chart, many traders often want to view the combination of the two chart types to see the full picture of the market. Therefore, a preferable approach would be to show the two chart types on a single integrated graph. However, due to the screen size limitations, the prior art systems do not offer satisfactory solutions for viewing the short-term chart details and the long-term chart details on a single axis.

A typical display has the screen size on the order of 1024×768 pixels, which means that using the extreme minimum of one pixel per each value to be displayed on the screen, only 1024 values could be displayed on a single linear chart. For example, if typical one-minute bars with high, low, open, and close were used, the maximum number of values that could be shown would be 256, or a four and a quarter hour time period (using a minimal four pixels per bar, with three pixels used for each bar and one pixel used for spacing between the bars). Then, if five-minute bars were displayed, the maximum number of bars would be still 256, while the time period range would increase to twenty-one and a quarter hours of trading time.

Therefore, based on the examples given above, the longer the time range displayed, the less detail is available about the fine-grained movements of the market. FIG. 1A is a block diagram illustrating a time scale diagram 100 that is often used to display time data series. The time scale diagram 100 is a linear time scale chart that is wide enough to see the entire year of data. However, as shown in FIG. 1A, it is almost impossible to see anything as small as a day, and totally impossible to see anything on the order of an hour, a minute, or a second, since there is not enough room to show such level of detail. Thus, the linear time scale chart 100 does not meet the objectives of showing both historical context and recent time fine-grained detail.

FIG. 1B illustrates another approach that can be used to display the combination of current and historical time series data using multiple linear time scale graphs 150. FIG. 1B illustrates three linear time scale charts 152, 154, and 156 that provide both, the broad historical context and most recent time fine-grained detail. More specifically, the chart 152 displays weekly, monthly, and quarterly timeframes, while the chart 154 displays hourly, and daily timeframes, and finally, the chart 156 displays data on the order of minutes and seconds corresponding to the last hour. However, this approach of displaying data is extremely wasteful of space, and a group of only few such graphs can be displayed on a screen. Also, the use of multiple graphs adds to the cognitive workload on a user, since it is harder to see and recognize price movements or patterns relative to historical highs and lows.

Another approach to displaying time series data is to use a logarithmic time scale. One possible implementation of a logarithmic time scale graph is to mark the leftmost mark on the scale "1 second," while the next evenly spaced mark to the right would be "10 seconds," assuming that a base-10 logarithmic scale is used, the next evenly spaced mark would be "100 seconds" (1 minute 40 seconds), the next would be "1000 seconds" (16 minutes, 40 seconds), the next would be "10,000 seconds" (two-hours, forty-six minutes, forty seconds), and so on. This approach appears to allow for displaying a wide range of time data series. FIG. 2 is a block diagram illustrating a base-10 logarithmic scale 200. The example graphical scale 200 displays the natural time periods rather than the evenly spaced marks, where the leftmost mark on the scale represents a time of one second, the next mark represents one minute, the next mark represents one hour, and so on.

However, the logarithmic time scale approach suffers from several problems. First, the natural evenly-spaced divisions are not natural units that make sense to a user, like seconds, minutes, five minutes, hours, days, weeks, months, quarters, etc., but are mathematical powers of the smallest logarithmic base unit. This problem can be addressed by using more natural division marks, such as the one shown in relation to FIG. 2, although the illustrated marks are not regularly spaced. The second problem with the logarithmic time scale is that the meaning of "bar" data is not obvious for viewing when displayed in relation to the logarithmic scale, because each bar appearing at a different place on the time scale has a different rollup period, and therefore causes reading of the displayed data to be counter-intuitive.

Thus, it would beneficial to provide a graphical display of data series that will not only provide up-to-date details and historical context data, but also one that will be intuitive for a trader to use.

BRIEF DESCRIPTION OF THE DRAWINGS

Example embodiments of the present invention are described herein with reference to the following drawings, in which:

FIG. 1A is a block diagram illustrating a conventional time scale diagram that is often used to display historical and the latest up-to-the-second data series;

FIG. 1B is a block diagram illustrating a plurality of conventional time scale diagrams that can be used to display historical and the latest up-to-the-second data series;

FIG. 7 is a block diagram illustrating an example method for constructing time contiguous regions of a linear time scale using a plurality of linear time scales according to one example embodiment.

DETAILED DESCRIPTION

I. Historical and Current Data Integrated Graph Display Overview

According to one example embodiment, a graphical interface is provided for displaying at least one data series. The data series can be associated with one or more variables having domains that extend over several orders of magnitude. An example of the data series could be one or more time series data; however, different data series could also be displayed in relation to the graphical interface of the example embodiments. Preferably, the graphical interface includes at least one axis, and the axis is divided into a plurality of axis regions that use different linear scales, while the combination of the regions forms a continuous non-linear scale axis. The graphical interface also includes at least one chart that is displayed in relation to the plurality of axis regions. The chart presents the data series that is plotted in each axis region based on a scale resolution corresponding to each respective axis region.

While the present invention is described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the present embodiments may be operated in an entirely software embodiment, in an entirely hardware embodiment, or in a combination thereof. However, for sake of illustration, the preferred embodiments are described in a software-based embodiment, which is executed on a computer device. As such, the preferred embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

The example embodiments that will be used hereinafter to illustrate different configurations and functionalities of the integrated chart will be described in relation to one or more time series of market data. However, it should be understood that the embodiments described in relation to subsequent figures are not limited to displaying time series data or market related data, and the embodiments could be applied to different data series and/or different data types.

Figure 2:
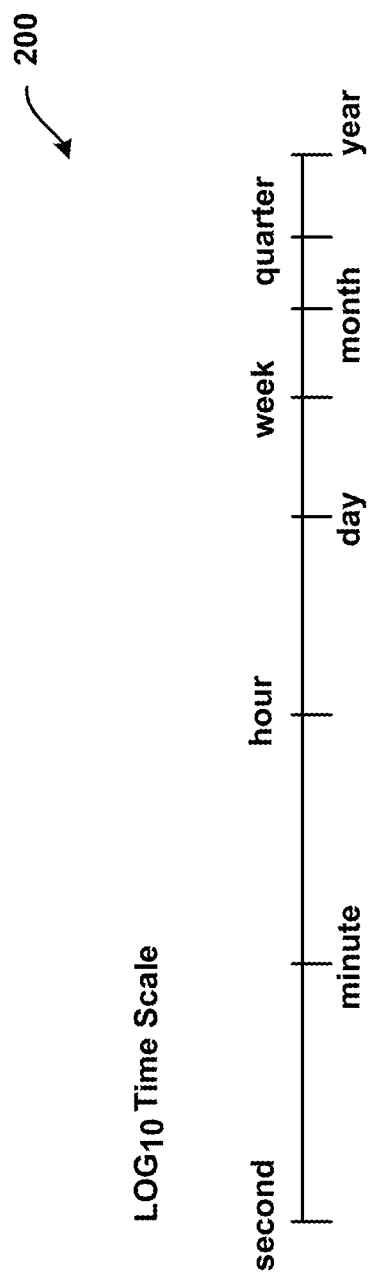
FIG. 2 is a block diagram illustrating a conventional logarithmic scale diagram that can be used to display historical and the latest up-to-the-second data series.
Figure 3:
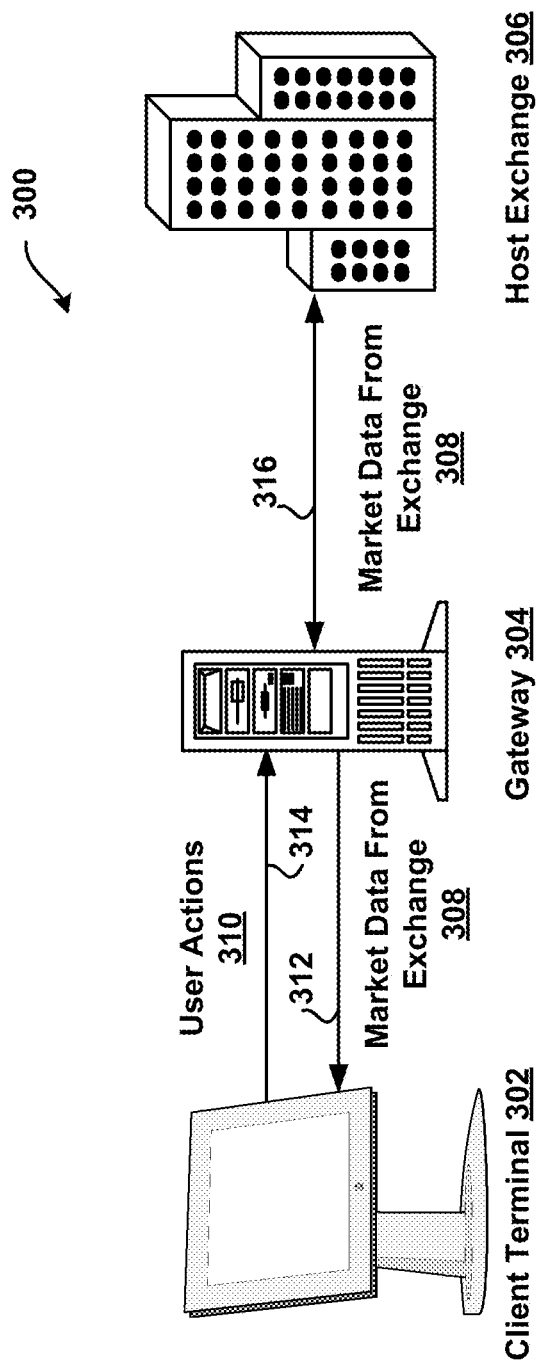
FIG. 3 is a block diagram illustrating an example network configuration for a communication system utilized to access one or more exchanges.

In an electronic trading environment, when a trader selects a tradeable object, the trader may access market data related to the selected tradeable object(s). Referring to FIG. 3, an example communication that might occur between an electronic exchange and a client terminal in accordance with the preferred embodiments is shown. During a trading session, market data 308, in the form of messages, may be relayed from a host exchange 306 over communication links 316 and 312 to a client terminal generally indicated as 302. As illustrated in FIG. 3, intermediate devices, such as gateway(s) 304, may be used to facilitate communications between the client terminal 302 and the host exchange 306. It should be understood that while FIG. 3 illustrates the client terminal 302 communicating with a single host exchange, in an alternative embodiment, the client terminal 302 could establish trading sessions to more than one host exchange.

The market data 308 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, an opening price, the price of the last trade, last traded quantity, the closing price, or order fill information. It should be understood that an electronic exchange might include more or fewer items depending on the type of tradeable object or the type of exchange. Also, it should be understood that the messages provided in the market data 308 may vary in size depending on the content carried by them, and the software at the receiving end may be programmed to understand the messages and to act out certain operations.

Typically, a trader may view the information provided from an exchange via one or more specialized trading screens created by software running on the client terminal 302. In addition to viewing market information using trading screens, a trader may view data displayed in relation to charts, such as an integrated chart that will be described in greater detail below. Upon viewing the market information or a portion thereof, a trader may wish to take actions, such as send orders to an exchange, cancel orders at the exchange, or change order parameters, for example. To do so, the trader may input various commands or signals into the client terminal 302. Upon receiving one or more commands or signals from the trader, the client terminal 302 may generate messages that reflect the actions taken, generally shown at 310. It should be understood that different types of messages or order types can be submitted to the host exchange 306, all of which may be considered various types of transaction information. Once generated, user action messages 310 may be sent from the client terminal 302 to the host exchange over communication links 314 and 316.

III. System Function and Operation

Figure 4:
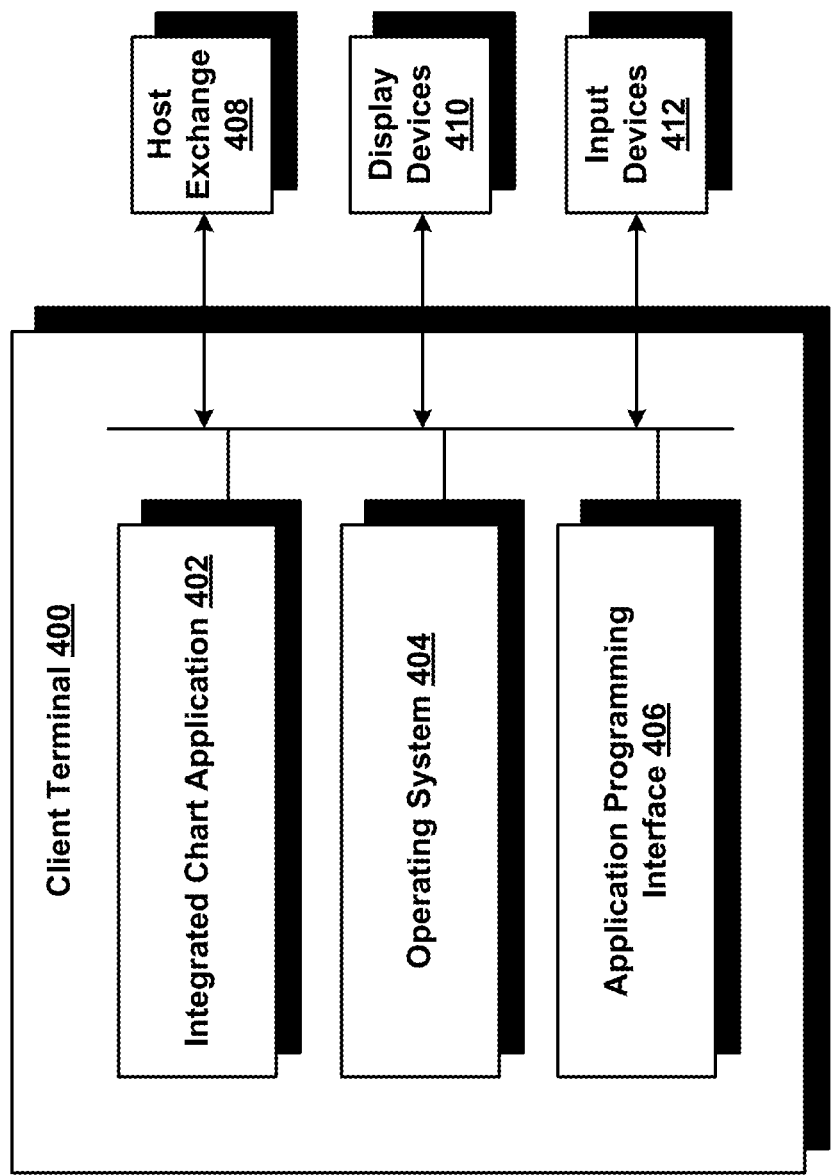
FIG. 4 is a block diagram illustrating an example client device with a number of layers defining different stages that can be used to implement embodiments of the present invention.

FIG. 4 is a block diagram illustrating a client device 400 with a number of layers defining different stages that may be used to implement embodiments of the present invention. The layers include an integrated chart application 402, an operating system 404, and an application programming interface ("API") 406. The client device 400 also preferably includes, among other things, at least a processor and memory (both of which are not shown in the figure, but are well-known computer components). Preferably, the processor has enough processing power to handle and process various types of market information. Therefore, the more market information is received and processed, the more processing power is preferred. However, any present day processor has enough processing power to handle and process various types of market information. Also, it should be understood that memory may include any computer readable medium. The term computer readable medium, as used herein, refers to any medium that participates in providing instructions to a processor unit for execution.

Preferably, the integrated chart application 402 has access to market information from one or more host exchanges 408 through an interface, such as an application programming interface ("API") 406. When the integrated chart application 402 receives information from the host exchange 408, it may arrange and display the received information on an integrated chart that a trader may view on the visual output display device 410. The display devices 410 could be a CRT-based video display, an LCD-based display, a gas plasma-panel display, a display that shows three-dimensional images, or a different display type. Also, the display device 410 could be a combination of separate display devices that can together create a composition in the user's visual field of each portion of the integrated chart, such as a head-mounted monocular see-through display that holds the integrated chart used together with another display that holds another interface, such as a trading interface. The integrated chart application 402 may also receive input signals from traders via input device 412. Example input devices may include a mouse, keyboard, game pad, joystick, or trackball. The input signals received from a user may include user requests to customize the view of the integrated chart, or an input defining one or more data types to be displayed in relation to the integrated chart. However, it should be understood that different input types are possible as well.

The operating system 404 may be used to manage hardware and software resources of the client terminal 400. General functions of the operating system 404 may include processor management, memory management, device management, storage management, application interface, and user interface. Any type of the operating system 404 may be used to implement the present embodiments, and examples of common operating systems include the Microsoft WINDOWS family of operating systems, the UNIX family of operating systems, or the MACINTOSH operating systems. However, those ordinarily skilled in the art will recognize that the added complexity of an operating system may not be necessary to perform the functions herein.

IV. Integrated Chart Display Examples

As mentioned in earlier paragraphs, the examples shown below will be described in reference to time series of market data received from electronic exchanges or, more specifically, traded price data associated with a tradeable object. However, it should be understood that the invention could be applied to any data series, not just those where time is the primary dimension, or where data is market related data. In general, the integrated charts could be used to display any variables that have domains extending over several orders of magnitude.

Figure 5:
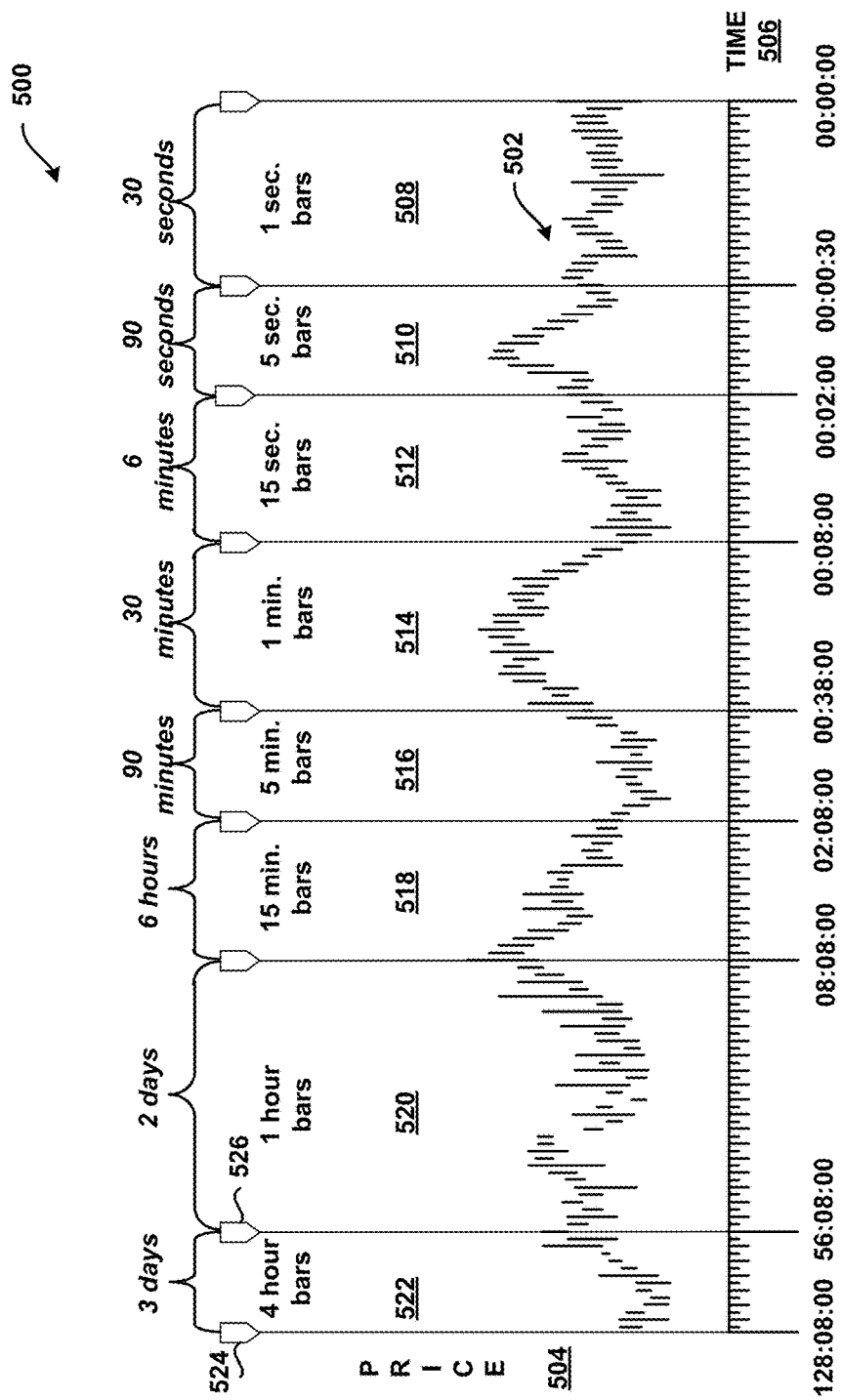
FIG. 5 is a block diagram illustrating an example chart for displaying historical and the most current data series according to one example embodiment.

FIG. 5 is a block diagram illustrating an example chart interface 500 for displaying historical and the most recent time series data according to one example embodiment. The example interface 500 displays a price chart 502 in relation to a time axis 506 and a price axis 504. The price chart 502 is displayed using a bar chart format, where each bar extends from the highest price to the lowest price detected for the timeframe corresponding to each bar. In addition to depicting the highest and lowest traded prices, each bar may also display the opening and closing price levels (not shown). In one embodiment, the lowest and highest traded price levels may be displayed in a format of small branches coming away from the main bar at the appropriate levels, with the closing prices positioned on the right side of the bar, and the opening price positioned on the left side of the bar. However, it should be understood that different types of charts could also be used in relation to the integrated chart display, such as, for example, a candlestick chart, a line chart, or any other chart type, and different data types related to a tradeable object could be displayed as well, such as traded volume.

The time axis 506 shows the combination of the most recent and historical price data corresponding to the last 5 days, 8 hours, and 8 minutes of prices, with half of the space used to show data from the last 38 minutes, and half of that used to show data from the last 3 minutes.

According to one preferred embodiment, the time axis 506 is divided into a plurality of axis regions 508-522 that form a continuous time axis. Each axis region uses a linear time scale, and the time scale is different within the neighboring regions. Referring to FIG. 5, for example, the axis region 508 corresponds to and displays data associated with the most current 30 seconds of trading, while the axis region 510 to the left of the region 508 corresponds to 90 seconds before the time period corresponding to the region 508. Similarly, the axis region 512 corresponds to 6 minutes before the time period of the axis region 510. Other regions display data based on the same principle, so that the axis regions 514-522 correspond to 30 minutes, 90 minutes, 6 hours, 2 days, and 3 days before the time period of each preceding axis region. Preferably, the ending point of one axis region and the start of the next region are related so that a continuous time axis is created and all data are displayed.

In the embodiments illustrated in FIG. 5, each time axis region is divided into sub-intervals, and the sub-intervals in a single region correspond to the same roll-up time interval. For example, each sub-interval in the axis region 502 corresponds to one second, while the sub-intervals of the axis region 518 correspond to 15 minutes. Also, in the embodiment illustrated in FIG. 5, while the sub-intervals of two neighboring regions correspond to different time periods, the sub-intervals are evenly spaced throughout the entire time axis. However, it should be understood that the sub-interval spacing of the two neighboring regions could be different based on user preferences.

In the preferred embodiment, a user can customize a number of regions as well as the time scales used in relation to each region on the time axis. For example, the chart interface 500 could display sliders to allow a user to segment the time axis 506 into a desired number of axis regions, or to increase/decrease a default number of regions preset for the chart interface. When the axis regions are created, a user could use the sliders corresponding to each region, such as sliders 524 and 526 in FIG. 5, to balance the width of each region based on user preferences. It should be understood that many more controls or commands could be used to allow settings of the sliders to be saved or restored.

In addition to resizing the axis regions, the window corresponding to the chart interface could be capable of resizing as well. The function of resizing the main window may have different user-controllable results, and the results may range from scaling the current data displayed in relation to each axis region, extending/shrinking the size of the axis region bordering the edge being resized, to extending/shrinking the size of all axis regions proportionately. In the embodiment allowing a user to resize the main window, the sliders corresponding to the axis regions preferably have a visually represented lockdown option to guarantee that the amount of data covered by the associated regions stays the same during resizing operations.

Alternatively, or in addition to making the regions user-customizable, the integrated chart application 402 could automatically control the size and scale of each region based on metrics about the volume, range, or how fast the price or any other value being plotted has moved within a time interval. In such an embodiment, the chart interface 500 can intelligently and automatically give a user enough details about time periods where details are necessary or interesting, and may use larger scales for axis regions where such detail is unnecessary because nothing interesting happened. It should be understood that the integrated chart application 402 could include a number of default settings, or user-configurable settings that could be used to control the layout of the display. The user-configurable settings could also enable a trader to define trigger points that could be used by the integrated chart application 402 to make decisions about automatic scale changes.

The present invention is not limited to the illustrated layout. In the example shown in relation to the display interface 500, the time or the value scale corresponding to the regions increases in one direction across the chart; however, different embodiments are possible as well. For example, a central region could be used to display fine-grained level of detail, and a number of regions with progressively less detail at larger scales could surround the central region. It should be understood that the regions could be positioned either horizontally or vertically in relation to the central region. Also, the central region with the fine-grained level of detail could be at a natural point in the scale of the vertical axis' value, such as a zero point on a scale that has both positive and negative numbers, or could be positioned at a point that emphasizes recent movements, such as the value at the start of the day, or one hour ago. Also, a region with a fine level of detail could be configured to correspond to a time period preceding, during, or immediately after a user configurable event, such as, for example, when a certain number comes out, when a predetermined market condition is detected, before or after the opening/closing time period, or upon detecting any other event.

It should be understood that the method for displaying data series can be used in relation to more than one axis, such as in relation to both the time axis 506 and the vertical price axis 504 in FIG. 5. In such an embodiment, the smallest level of detail could be used in relation to a region corresponding to where the price currently is, and the current price region could be surrounded with other regions, extending both up and down, and the regions can be scaled differently, e.g., showing a larger price range in a smaller space. The vertical regions could also be user configurable, and could have slider controls to permit a user to expand or shrink sizes of the regions in a manner that the user will find desirable.

The time series data in each region may be updated real-time as new data updates are received. In the example described in reference to FIG. 5, the data displayed in relation to the chart interface may be updated based on update messages being received from one or more exchanges. However, the updates could be received from other data sources as well depending on the type(s) of data displayed in relation to the integrated graphical chart interface, and the example embodiments are not limited to receiving market data updates.

It should be understood that many different methods could be used to update graphical representation of one or more data series displayed on the chart interface. In one embodiment, as time passes, each region may move the existing display one bar width, and may display a bar for the newest time interval. Thus, in the region 514 that uses one-minute bars, a new bar may be plotted every minute as the region of the chart 502 scrolls to the left and is clipped by the fixed width boundary edge of the region 514. For example, plotting of the data series on a display screen may be performed using a technique commonly known in the art as double buffering, which first draws an offscreen image, and then transfers the prepared image to a primary display screen; however, different methods could also be used.

The method described above that draws a new bar and scrolls the rest of the region when the update is performed requires little computation since only the regions with the smallest time intervals are updated very often. For example, in the chart interface 500 that begins with one-second bars, the region 508 corresponding to the one second intervals is updated once a second, and the neighboring region 510 using five second intervals are updated once every 5 seconds, and so on. However, it should be understood that different methods for updating data on the chart interface could also be used. Also, because the displayed data scrolls out of (or is clipped by region boundaries) at different rates for each region, there is preferably a small overlap in the time ranges displayed. However, it should be understood that depending on the method used for creating the chart, there could be no overlap in the time ranges as well.

Figure 6:
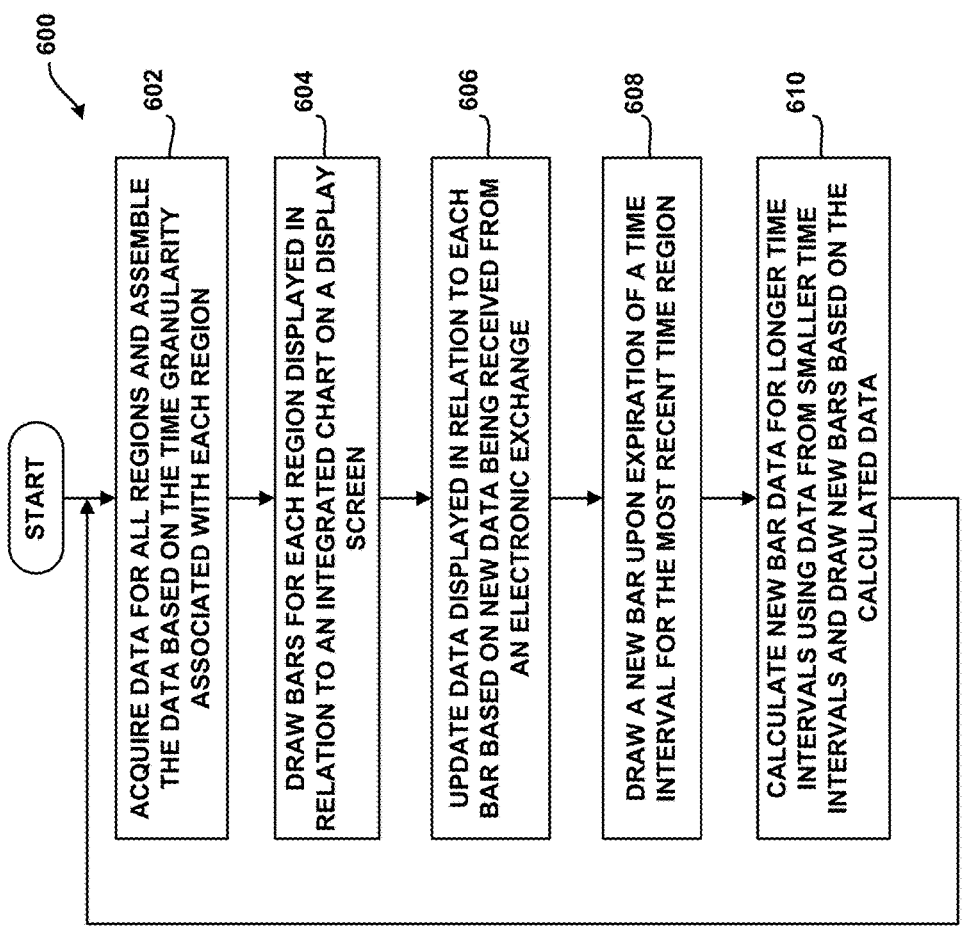
FIG. 6 is a flowchart describing a method for displaying time series data in relation to a chart according to one example embodiment.

FIG. 6 is a flowchart illustrating an example method 600 for drawing and updating data displayed in relation to an integrated chart display. The flowchart of FIG. 6 shows the functionality and operation of a possible implementation of the present embodiments. In this regard, each block may represent a module, a segment, or a portion of code, which includes one or more executable instructions for implementing specific logical functions or steps in the process. It should be understood that alternate implementations are included within the scope of the preferred embodiment of the present invention in which functions may be executed out of order from that shown or discussed, including substantially concurrently or in reverse order, depending on the functionality involved, as would be understood by those reasonable skilled in the art of the present invention. Also, the method 600 will be described in relation to the components illustrated in FIG. 4; however, it should be understood that different components could also be used to execute the method.

Referring to FIG. 6, at step 602, the integrated chart application 402 acquires data for all regions, and assembles the acquired data based on the time granularity used in relation to each region. For example, for a one-hour time region that uses 15-minute bars (with high, low, open, and close values displayed in relation to each bar), the integrated chart application 402 may acquire, determine, and group charted values for four bars of the one-hour time period.

At step 604, the integrated chart application 402 draws bars for each region displayed in relation to the integrated chart on a display screen. It should be understood that different drawing methods/algorithms could be used to draw bars onto a display screen, and the embodiments described herein are not limited to any particular method or algorithm. For example, as mentioned in relation to FIG. 5, the integrated chart application 402 may use the double buffering drawing algorithm to first draw the bars into a private drawing context (e.g., a bitmap). The integrated chart application 402 may then transfer the created bitmaps to create a composite bitmap using the bit block transfer ("BITBLT") function, the Display Data Channel ("DDC"), or any other function or method. The composite bitmap may then be transferred to the display screen. Alternatively, rather than using the double buffering function, the integrated chart application 402 could use a markup-based drawing algorithm, such as the Scalable Vector Graph ("SVG"), Extensible Application Markup Language ("XAML"), Web3D, or any other algorithm that can be used to create the markup (tags) for each region using the markup's object model or the scene graph.

At step 606, the integrated chart application 402 updates data displayed in relation to each bar based on data updates being received from an outside source, such as market data updates being received from one or more electronic exchanges. For example, upon receiving a data update, the integrated chart application 402 may calculate incremental values for quantities being tracked and displayed in relation to the integrated chart. In an embodiment where the integrated chart tracks high and low values for a specified quantity, the integrated chart application 402 may determine maximum and minimum values for the most recent time period by comparing the currently used maximum/minimum values detected for the time period to the new value received from the outside source. Then, if any new maximum/minimum values are detected, the integrated chart application 402 may update the bars accordingly.

At step 608, the integrated chart application 402 draws a new bar upon detecting expiration of the time sub-interval corresponding to the most recent time period. For example, if the most recent time period displays one-minute bars, when the integrated chart application 402 detects that one minute has elapsed, which can be detected using time stamp data or a local system clock, a new bar may be drawn. If drawing is performed directly on a display screen, the integrated chart application 402 may first shift the bar drawn over, clipping off the oldest bar, and draw the newest bar next to the boundary of the one minute bar region. Alternatively, if the double buffering method is used instead, the integrated bar chart application 402 may first draw a new bar into a drawing context or a bitmap. Then, the application may use the BITBLT function to transfer the created bitmap region to the composite bitmap, and then to the display screen. If the markup-based drawing is used instead, the application 402 may insert the new data into the object model by adjusting the transform element for the region to have the effect of scrolling contents so that the new data can be drawn.

At step 610, the integrated bar chart application 402 calculates new bar data for longer time intervals using data from smaller time intervals, and proceeds to draw the new bars as described above. For example, if the one minute bar region is followed by the five minute bar region, the integrated bar chart application 402 may calculate data for the newest five minute bar using data from the oldest five one-minute bars in the adjacent data region. Then, the method 600 may continue at step 602, and the steps taken by the integrated bar chart application 402 may be repeated.

FIG. 7 is a block diagram explaining one example method that may be used to create an example chart interface for displaying historical and current time series data according to one example embodiment using the double buffering method. As explained in reference to the preceding figures, the chart interface of the preferred embodiments uses one or more non-linear scale axes to plot the value of a selected variable corresponding to a data series, and each axis may be divided into a number of regions that use linear scale axes. One example design of the chart interface can be explained using multiple linear time scales described in reference to FIG. 1B. FIG. 6 illustrates a plurality of linear time scale axes 700, 702, 704, 706, and 708, the portions of which can be used to compose an integrated time axis of the chart interface of the present embodiments. More specifically, the scale axis 700 displays a time scale that includes the longest time period ranging from the last second up to one year. Then, the remaining time axes 702-708 correspond to shorter time periods, such as one week, 8 hours, an hour, and 30 minutes, respectively.

In one example embodiment, the multiple time axes 700-708 can be broken into time-contiguous sections that may be then combined to create the non-linear scale axis described in reference to FIG. 5. An example set of time axis sections 710, 712, 714, 716, and 718, are illustrated in relation to the axes in FIG. 7. In the embodiment using the double buffering drawing method, each time axis section 710-718 corresponds to a bitmap on the private drawing device context, and the new data is drawn on each respective bitmap. Then, the bitmaps may be transferred using the BITBLT function to create the composite bitmap, such as the one illustrated at 720. In the composite bitmap, the region on the leftmost part of the composite bitmap 720 corresponds to the most recent time period, while each adjacent region uses a progressively larger time scale. However, the regions could be arranged based on any user preferences, some of which were described in relation to earlier figures. The composite bitmap 720 may then be transferred to the display screen using the BITBLT, or some other function.

Also, due to different time scales being used by the neighboring regions and the need to not omit any values from the display when data displayed in relation to each region are updated, the regions may be coupled such that there is some time overlap in the contiguous regions. For example, for a region of five-minute bars adjacent to a region with one-minute bars, the earliest five-minute bar may contain data from up to five minutes of the one-minute bar region. However, it should be understood that the level of the overlap may vary based on a method used for updating data displayed in relation to each region, or based on some other factors, and some embodiments may use no overlapping regions.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for an integrated display of historical and current data series may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for displaying a data series, comprising:
receiving, using a computer device, market data from an electronic exchange, the market data including a data series for a tradeable object being traded at the electronic exchange, where the data series is dynamically updated according to market updates from the electronic exchange;
dynamically displaying, via an electronic display of the computing device, the market data relative to a time axis and a chart axis of a price chart, the time axis having a recent data region and an older data region, where a linear time scale for the recent data region and a linear time scale for the older data region form a continuous non-linear time scale; and
in response to receiving a new market update in the market data,
displaying, via the electronic display of the computing device, the new market update in the recent data region having a first linear scale, and
automatically shifting, via the electronic display of the computing device, an oldest market update previously displayed in the recent data region to the older data region.

2. The method of claim 1 where the linear time scale for the recent data region is different than the linear time scale for the older data region.

3. The method of claim 1 where the price chart comprises at least one of a candlestick chart, a bar chart and a line chart.

4. The method of claim 1 where the time axis is divided into sub-intervals.

5. The method of claim 1 where time axis comprises a plurality of sub-intervals.

6. The method of claim 5 where the plurality of sub-intervals are evenly spaced over the time axis.

7. The method of claim 1 where the time axis comprises a plurality of older data regions.

8. The method of claim 7 where a number of the plurality of older data regions is user configurable.

9. The method of claim 7 where a time scale for each older data region of the plurality of older data regions is user configurable.

10. The method of claim 7 further comprising:
receiving, via an input of the computer device, a user command to adjust a size of at least one region of the plurality of older data regions; and
in response to receiving the user command adjusting, the size of the at least one older data region of the plurality of older data regions.

11. The method of claim 10 further comprising displaying via the electronic display a movable icon.

12. The method of claim 11 where the user command is received via the movable icon.

13. The method of claim 1 where the linear scale for the older data region comprises any one of a year-based timeframe, a quarter-based timeframe, a month-based timeframe, a week-based timeframe, a day-based timeframe, an hour based timeframe and a minute based timeframe.

* * * * *